US011440653B2

(12) United States Patent
Thompson et al.

(10) Patent No.: US 11,440,653 B2
(45) Date of Patent: Sep. 13, 2022

(54) ANTI-DRIVE MECHANISM FOR ROTARY AIRCRAFT CONTROL

(71) Applicant: Bell Textron Inc., Fort Worth, TX (US)

(72) Inventors: Terry K. Thompson, Bedford, TX (US); Mark Wiinikka, Hurst, TX (US); Bryan Baskin, Arlington, TX (US); Vince Calabrese, Fort Worth, TX (US); Samantha Renee Lucero, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 78 days.

(21) Appl. No.: 16/894,321

(22) Filed: Jun. 5, 2020

(65) Prior Publication Data

US 2021/0380231 A1 Dec. 9, 2021

(51) Int. Cl.
*B64C 27/605* (2006.01)

(52) U.S. Cl.
CPC .................. *B64C 27/605* (2013.01)

(58) Field of Classification Search
CPC .................................. B64C 27/605
See application file for complete search history.

(56) References Cited

U.S. PATENT DOCUMENTS

| | | | | |
|---|---|---|---|---|
| 2,973,815 A * | 3/1961 | Sznycer | | B64C 27/605 416/114 |
| 3,841,586 A * | 10/1974 | Broadley | | B64C 27/605 416/114 |
| 5,083,725 A * | 1/1992 | Byrnes | | B64C 27/605 416/114 |
| 5,199,849 A * | 4/1993 | Leman | | B64C 27/605 416/114 |
| 6,074,168 A * | 6/2000 | Rampal | | B64C 27/605 416/114 |
| 6,149,386 A * | 11/2000 | Rampal | | B64C 27/605 416/114 |
| 7,021,897 B2 * | 4/2006 | Scala | | B64C 27/605 416/114 |
| 8,961,138 B2 | 2/2015 | Wiinikka et al. | | |
| 9,151,162 B2 * | 10/2015 | Thompson | | F01D 5/02 |
| 2013/0149150 A1 * | 6/2013 | Wiinikka | | B64C 27/605 416/114 |

(Continued)

FOREIGN PATENT DOCUMENTS

EP 2679493 A1 1/2014

OTHER PUBLICATIONS

EPO Search Report issued in EP Application 21163593.3 dated Sep. 13, 2021, 5 pages.

*Primary Examiner* — Tye William Abell
(74) *Attorney, Agent, or Firm* — Akona IP PC (57) ABSTRACT

One embodiment includes a swashplate assembly for a rotary aircraft, including: a rotating ring configured to rotate with a drive shaft of the rotary aircraft; a non-rotating ring coupled to the rotating ring and rotationally decoupled from the rotating ring, wherein the non-rotating ring does not rotate with the rotating ring and drive shaft; an outer casing disposed around the gearbox; and an anti-drive mechanism to maintain the outer casing rotationally stationary relative to the gearbox, the anti-drive mechanism including a key and slot system between the gearbox and the outer casing.

20 Claims, 8 Drawing Sheets

(56) References Cited

U.S. PATENT DOCUMENTS

2014/0124615 A1\* 5/2014 Thompson ............ B64C 27/605
                                                    416/112
2017/0129598 A1\* 5/2017 Stucki ..................... B64C 27/48
2018/0119729 A1\* 5/2018 Baskin .................... F16C 33/24
2019/0382107 A1\* 12/2019 Shimek ................. B64C 27/605

\* cited by examiner

ANTI-DRIVE MECHANISM FOR ROTARY AIRCRAFT CONTROL

TECHNICAL FIELD

This disclosure relates generally to aeronautical engineering, and more particularly, though not exclusively, to a system and method for providing an anti-drive mechanism for rotary aircraft control.

BACKGROUND

Rotary wing aircraft may be used to perform a variety of tasks requiring a high degree of functional flexibility.

SUMMARY

In an example, there is a swashplate assembly for a rotary aircraft, comprising: a rotating ring configured to rotate with a drive shaft of the rotary aircraft; a non-rotating ring coupled to the rotating ring and rotationally decoupled from the rotating ring, wherein the non-rotating ring does not rotate with the rotating ring and drive shaft; an outer casing disposed around the gearbox; and an anti-drive mechanism to maintain the outer casing rotationally stationary relative to the gearbox, the anti-drive mechanism comprising a key and slot system between the gearbox and the outer casing.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

Figure 1:
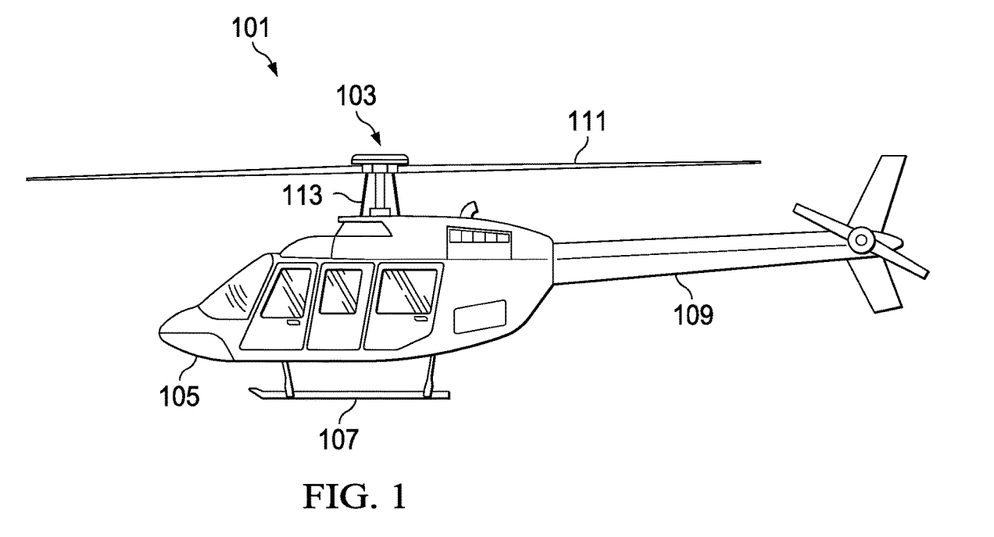
FIG. 1 illustrates an example embodiment of a rotorcraft.

FIG. 1 illustrates an example embodiment of a rotorcraft 101. Rotary aircraft 101 could be either a manned or an unmanned rotary aircraft. In some cases, rotary aircraft 101 could be electrically powered instead of powered by jet fuel. In those cases, rotary aircraft 101 could either be designed from the start with an in-air recharging system, or it could be modified after production with an aftermarket in-air recharging system.

In cases where rotary aircraft 101 is powered by jet fuel, it could be modified to serve as a tanker for in-air recharging of electrical aircraft such as electrically powered drones. For example, rotary aircraft 101 could include a generator that converts its jet fuel power into electrical power, and that electrical power could be shared with electrical aircraft such as drones.

The illustrated example portrays a side view of rotorcraft 101. Rotorcraft 101 includes a rotor system 103 with a plurality of rotor blades 111. The pitch of each rotor blade 111 can be managed or adjusted in order to selectively control direction, thrust, and lift of rotorcraft 101. Rotorcraft 101 further includes a fuselage 105 and a tail structure 109. In the illustrated embodiment, tail structure 109 may be used as a horizontal stabilizer. Torque is supplied to rotor system 103 using at least one engine.

In this illustration, rotor blades 111 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, rotorcraft 101 may be an autonomous drone vehicle, or a remote-controlled drone vehicle, in which case some control functions are provided by a computer.

Figure 2:
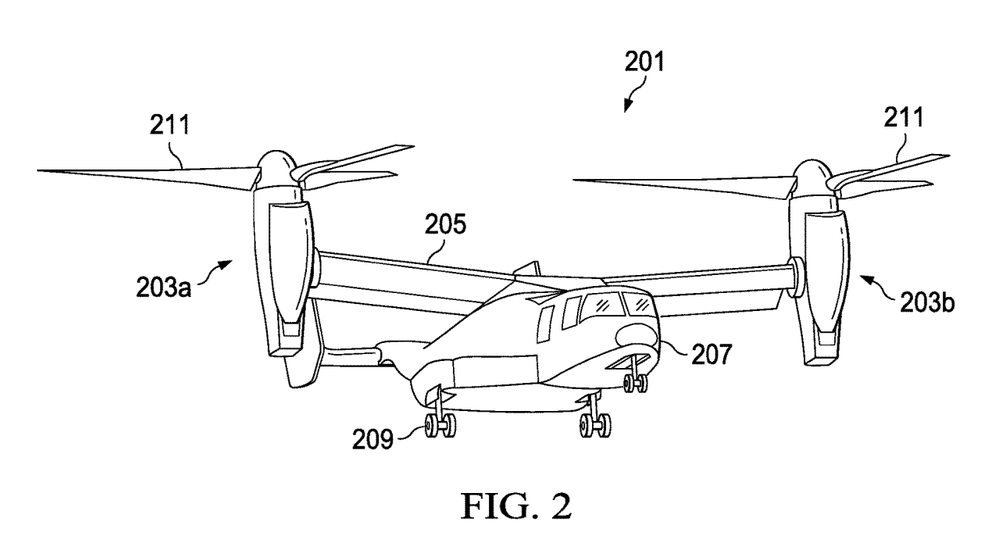
FIG. 2 illustrates a perspective view of an example tiltrotor aircraft.

FIG. 2 illustrates a perspective view of an example tiltrotor aircraft 201. Tiltrotor aircraft 201 could be either a manned or an unmanned rotary aircraft. In some cases, tiltrotor aircraft 201 could be electrically powered instead of powered by jet fuel. In those cases, tiltrotor aircraft 201 could either be designed from the start with an in-air recharging system, or it could be modified after production with an aftermarket in-air recharging system.

In cases where tiltrotor aircraft 201 is powered by jet fuel, it could be modified to serve as a tanker for in-air recharging of electrical aircraft such as electrically powered drones. For example, tiltrotor aircraft 201 could include a generator that converts its jet fuel power into electrical power, and that electrical power could be shared with electrical aircraft such as drones.

Tiltrotor aircraft 201 includes nacelles 203a and 203b, a wing 205, and a fuselage 207. Each nacelle 203a and 203b respectively includes a plurality of rotor blades 211. Moreover, each nacelle 203a and 203b may include an engine and gearbox for driving rotor blades 211. In some embodiments, nacelles 203a and 203b may each be configured to rotate between a helicopter mode, in which the nacelles 203a and 203b are approximately vertical, and an airplane mode, in which the nacelles 203a and 203b are approximately horizontal.

It should be appreciated that rotorcraft 101 of FIG. 1 and tiltrotor aircraft 201 of FIG. 2 are merely illustrative of a variety of aircraft that can be used to implement embodiments of the present disclosure. Other aircraft implementations can include, for example, fixed-wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

In this illustration, rotor blades 211 form a motive subsystem, or in other words, a subsystem that provides the motive force to move the aircraft. The controls that manage or adjust the control direction form a control subsystem, which can include manual user controls, as well as computer augmentation to manual user control. Furthermore, in some embodiments, tiltrotor aircraft 201 may be an autonomous drone vehicle, or a remote-controlled drone vehicle, in which case some control functions are provided by a computer.

Control of an illustrative rotary aircraft includes the use of pilot inputs, such as via a control yoke. Pilot inputs on the control yoke are translated to movement via actuators that act on a swashplate. A typical swashplate includes a rotating ring that rotates with the rotors and the driveshaft. The top case, outer housing (tilt ball) and a non-rotating ring do not rotate. The rotating ring and the non-rotating ring may be joined to one another, for example, via a duplex or triplex bearing. In an illustrative embodiment, a tilt ball is disposed around the top case as an exterior casing, and acts essentially as a large bearing for the control system.

In an embodiment, three actuators input loads to change the pitch of the blades. These actuators translate and tilt the swashplate, and the swashplate translates this movement into displacement of the rotors. For changes to so-called collective blade pitch, the entire rotor moves jointly in a single direction. For example, to induce forward motion in the rotary aircraft, the swashplate tilts forward. When the tilt ball and swashplate move up the top case axially, it will increase the angle of attack on all blades and produce an upward vertical motion.

The swashplate and tilt ball may also be used to produce cyclic blade pitch. In contrast to collective blade pitch, cyclic blade pitch is not a gross movement of the entire rotor mechanism. Rather, one or more of the actuators moves and acts on the swashplate, and tilts the swashplate about the tilt ball. As the swashplate tilts the rotor follows the tilt, while pitch links on the swashplate transmit pitch information to the blades. Therefore, when a pitch link dips down, this decreases the pitch on the blade. If a pitch link tilts up, it increases the pitch on that blade. This combination of collective blade pitch and cyclic blade pitch produces an input and the aircraft follows the direction of the control input.

To maintain this control, the non-rotating ring of the swashplate receives control inputs and translates them to the rotating ring. For this to operate mechanically as intended, the non-rotating ring should not rotate about or relative to the tilt ball and/or the top case. Rather, the non-rotating ring should remain rotationally static. However, when actuators displace the swashplate, this motion tends to try to drive the non-rotating ring and make it rotate relative to the tilt ball.

To prevent the tilt ball from rotating relative to the top case, an anti-drive mechanism or anti-drive means may be employed. The anti-drive means essentially lock the tilt ball into place relative to the top case. To preserve the collective pitch motion, which requires the tilt ball to slide axially relative to the top case, the anti-drive means should permit this axial motion.

Figure 3:
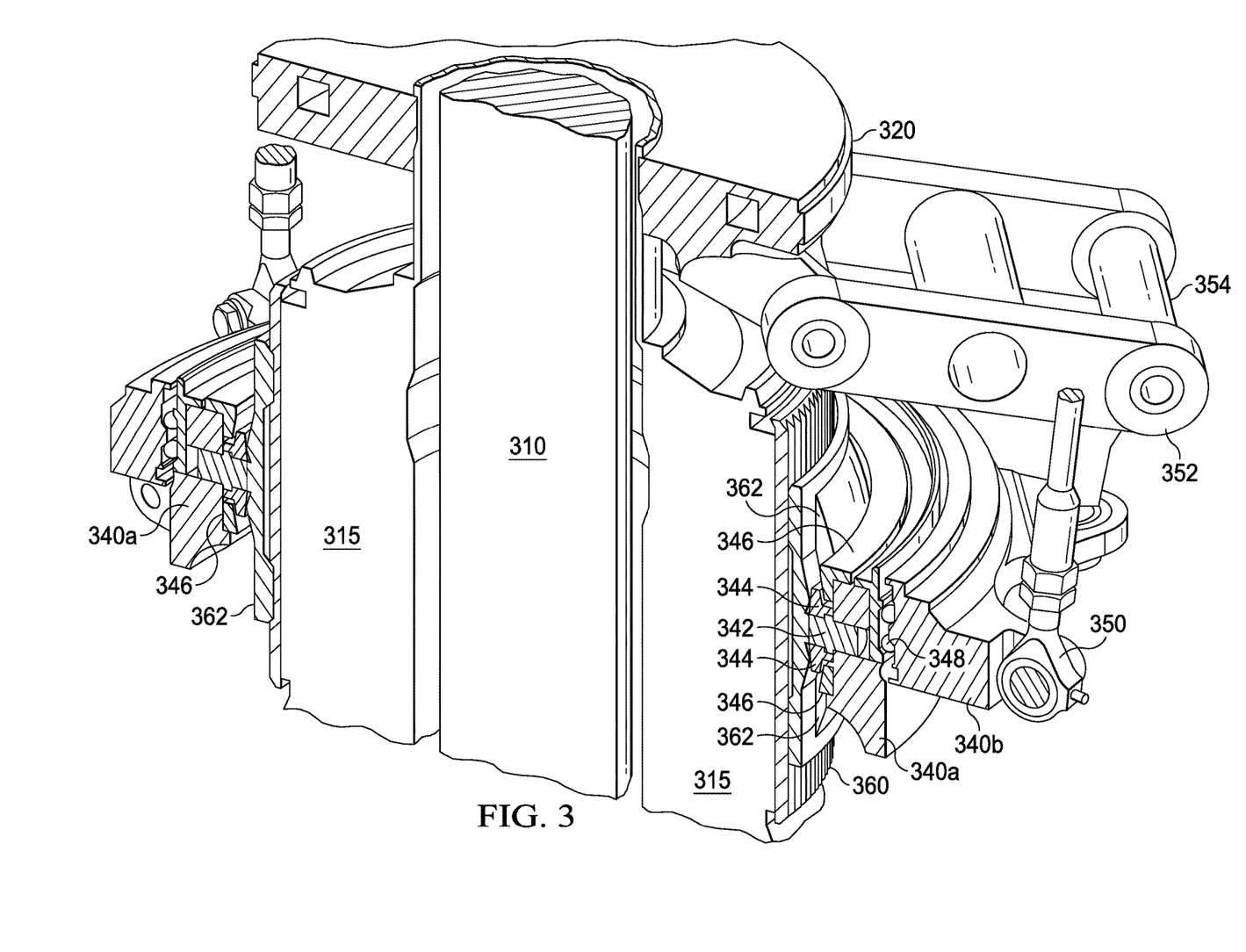
FIG. 3 illustrates a longitudinal cross-section of an example rotor system.
Figure 4:
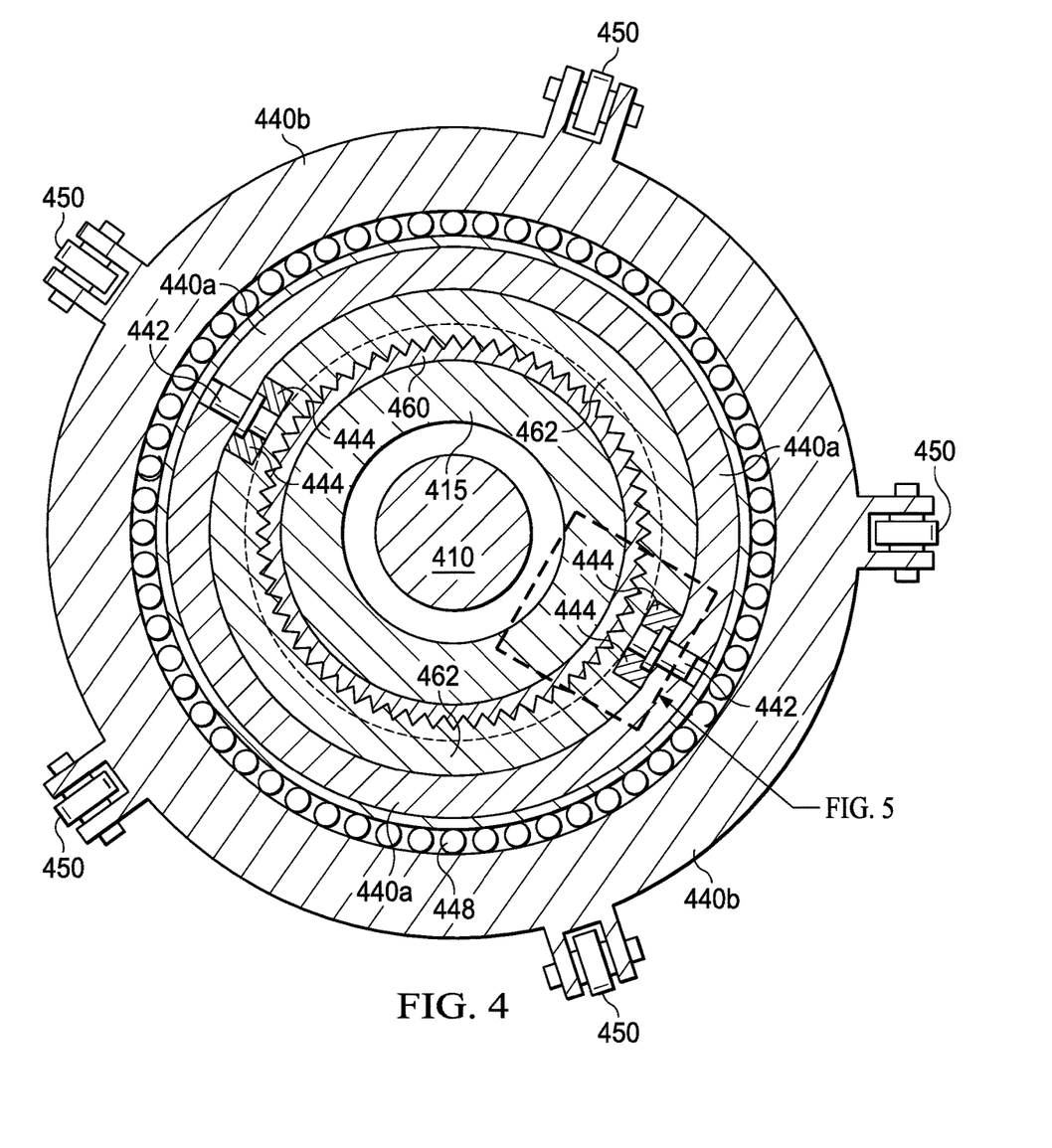
FIG. 4 illustrates a transverse cross-section of an example rotor system.
Figure 5:
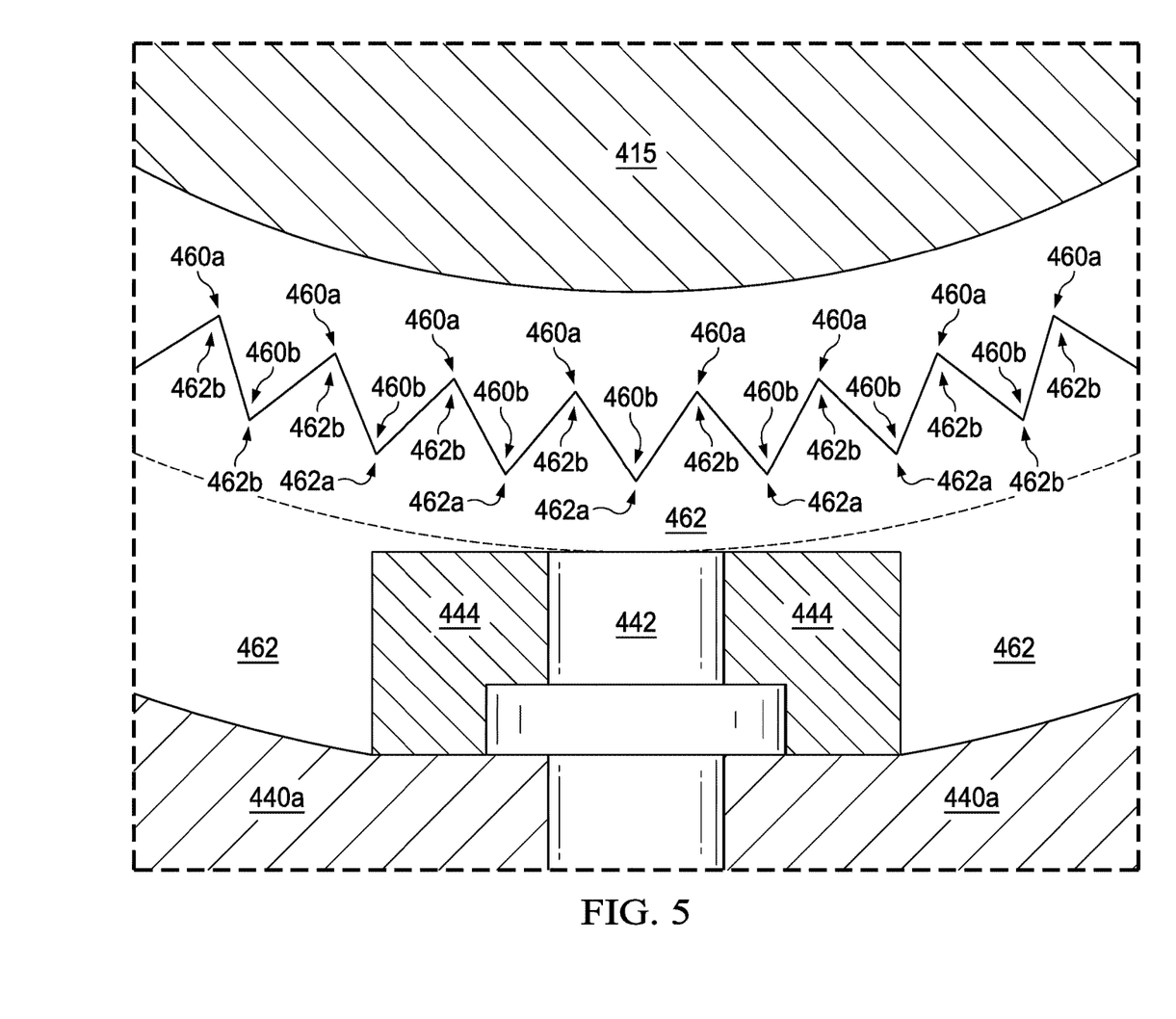
FIG. 5 illustrates a detail view of the transverse cross-section of the rotor system of FIG. 4.

An existing solution is the use of a sliding spline that locks out rotation between the tilt ball and the gearbox. This sliding spline may be provided via an external casing on the gearbox, which may typically be constructed of aluminum. Such a spline mechanism is illustrated in FIGS. 3, 4, and 5 of the present specification, described in greater detail below. This spline mechanism provides effective anti-drive means to prevent the tilt ball from rotating relative to the gearbox. It also advantageously provides the translatable axial motion up and down the gearbox.

However, this spline configuration can be improved. For example, the joint at the splines experiences substantial wear when the aircraft is in service. Thus, the spline teeth may require a wear coating to prevent degradation and to preserve performance. Because of the complex geometry of the spline, it is easiest to plate the spline, such as by hard anodizing the aluminum. However, this hard anodizing reduces the strength of the aluminum and hastens metal fatigue.

Steel is a more durable option than aluminum, and advantageously can take a thin, dense chrome plating as a wear coating. This provides a more durable anti-drive mechanism than hard anodized aluminum. However, steel is much heavier than aluminum. In an illustrative example, the sleeve around the gearbox that provides the spline mechanism has a diameter of approximately 18 inches, and similarly, a height of approximately 18 inches. If this sleeve were constructed of steel, it would contribute approximately 50 to 60 pounds of weight to the rotary aircraft, thus reducing its payload capacity or airlift capacity by a corresponding 50 to 60 pounds.

It is therefore beneficial to have an anti-drive means that can be constructed of steel, thus providing for greater durability and strength, and an improved wear coating such as chrome plating, while also not adding as much weight to the aircraft.

Figure 6:
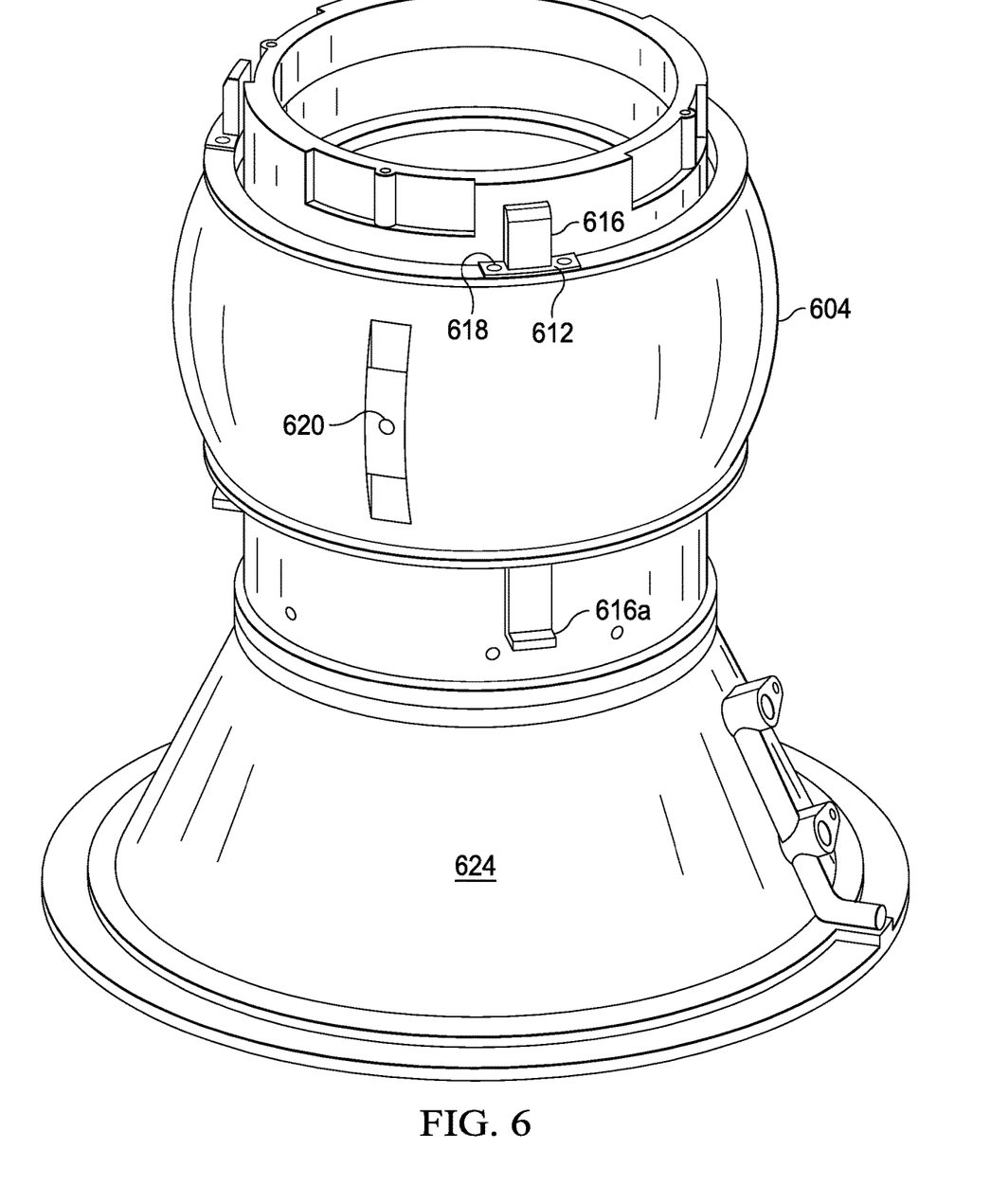
FIG. 6 illustrates an alternative embodiment of an anti-drive mechanism.
Figure 7:
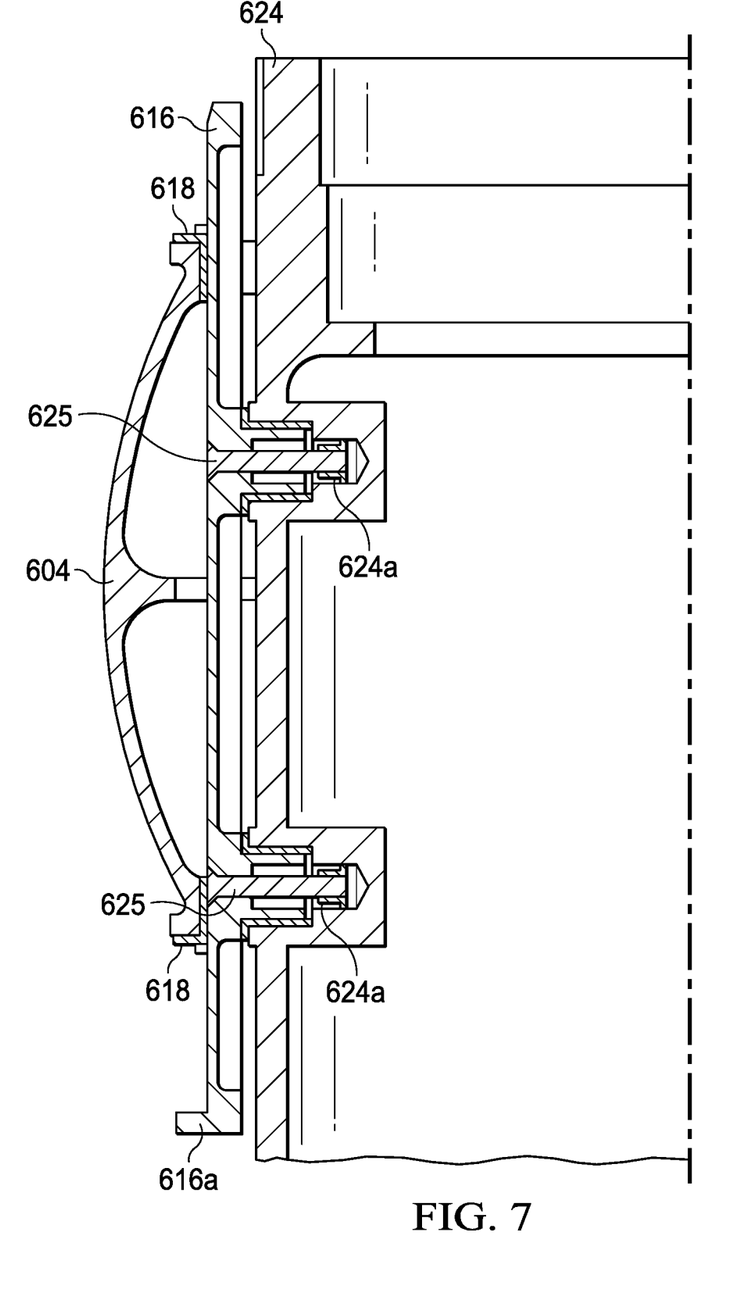
FIG. 7 illustrates a cutaway view of select elements of the anti-drive mechanism of FIG. 6.

As illustrated in FIGS. 6 and 7 of the present specification, described in greater detail below, the spline mechanism illustrated in FIGS. 3-5 can be supplemented, or even completely replaced, with a key-and-slot mechanism. Advantageously, the key-and-slot mechanism does not require a full exterior sleeve around the top case. Rather, one or more keys (for example, three keys) can be attached directly to the top case of the gearbox. These keys may have a length of approximately the same height as the top case, and may be configured to engage internal slots on the tilt ball. Because these keys do not require a full sleeve around the top case, they can be constructed of a material, such as steel, without contributing substantial weight to the aircraft.

For example, in an illustrative embodiment, three such keys can be attached equidistantly, radially around the top case. These three steel keys may have a thin, dense chrome plating as a wear surface, and in total contribute only an additional 4 to 5 pounds to the weight of the aircraft, as opposed to 50 to 60 pounds in the case of a full steel sleeve around the top case.

An advantage to the key-slot arrangement is that the simple geometry of the key allows the use of an aluminum key with a tungsten carbide coating. Applying this coating generally includes grinding the part to a close tolerance before and after application. The complexity of a splined interface makes it difficult to apply such a coating, while the flat surfaces of the key are well-suited for the use of tungsten carbide.

In an illustrative embodiment, these keys mate to corresponding slots in the tilt ball. Guide bearings may be used as a replaceable wear item in the slots of the tilt ball mating with the keys. As a secondary retention feature, fasteners may be used in the holes of the top case. These fasteners are not intended to bear the load of the anti-drive mechanism, but as a secondary retention feature using floating inserts to prevent loading of the fasteners. Advantageously, the key and slot configuration can be manufactured relatively easily, and does not require specialized machining, which may be necessary for the spline configuration. It should be noted, however, that the key-and-slot configuration and the spline configuration are not mutually exclusive. A spline configuration could be used in conjunction with a key-and-slot configuration, or the key-and-slot configuration could be used instead of the spline configuration.

Figure 8:
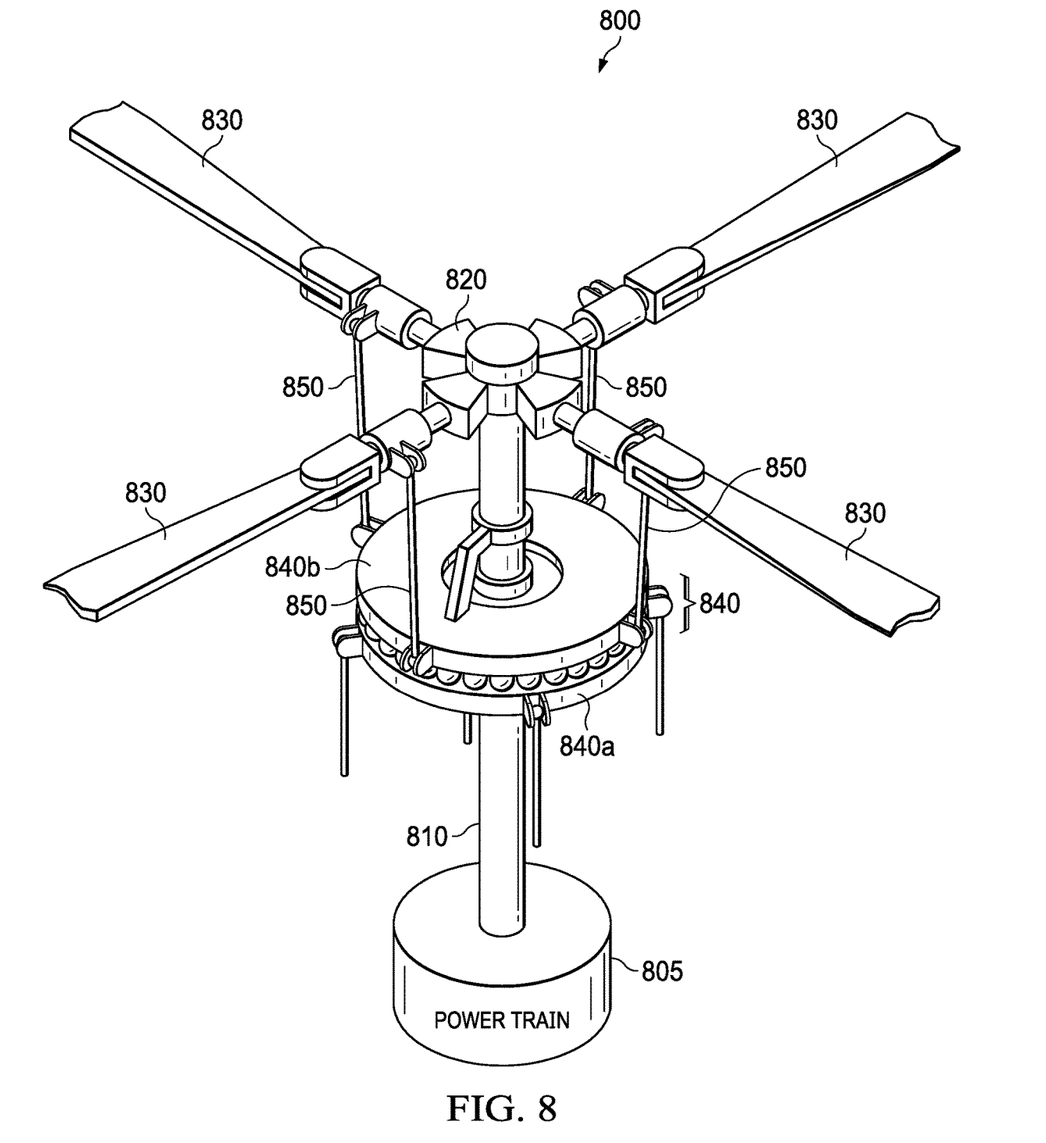
FIG. 8 illustrates an example helicopter rotor assembly.
Figure 9:
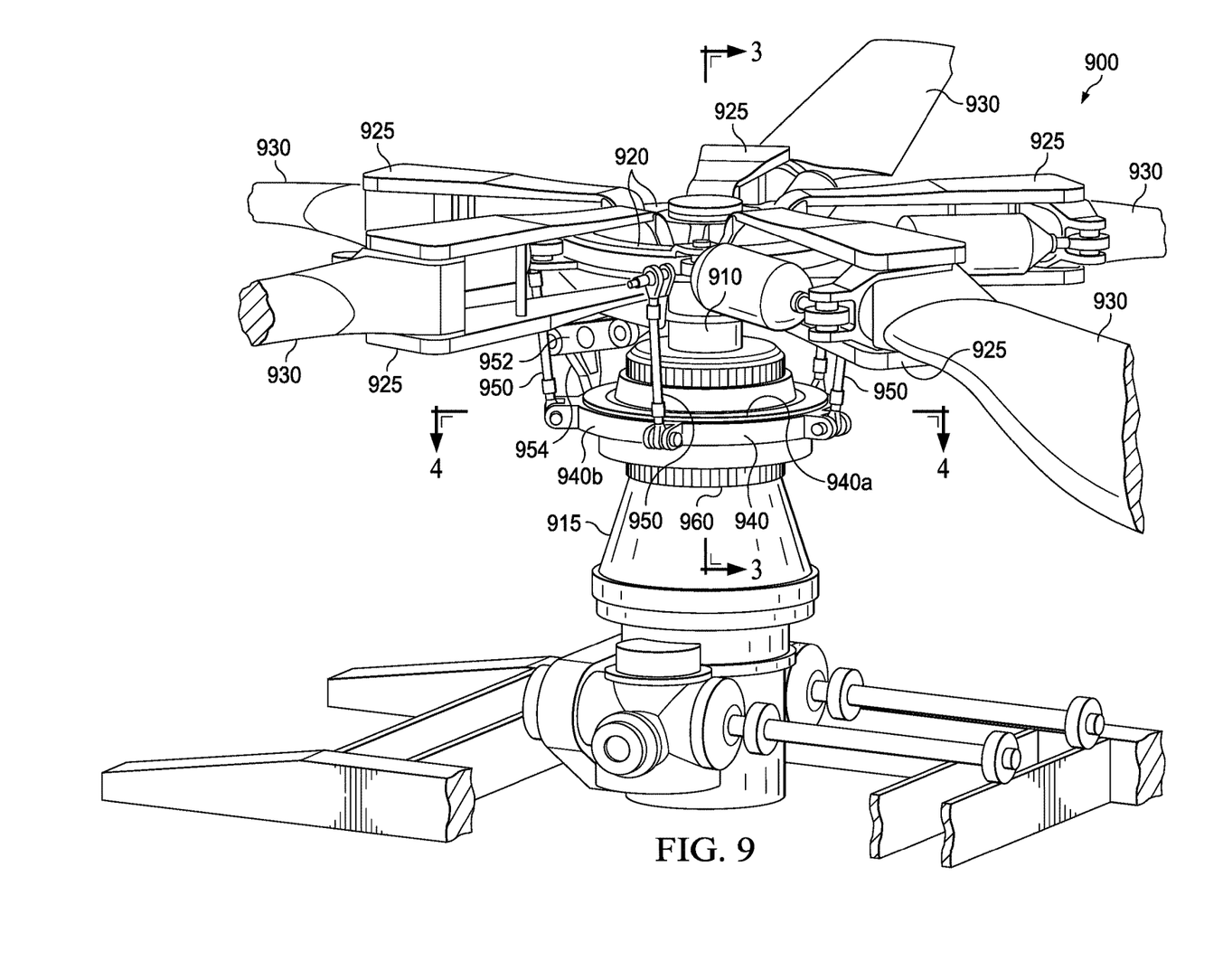
FIG. 9 illustrates a rotor system, according to one example embodiment.

FIG. 3 illustrates a longitudinal cross-section of an example rotor control system. FIGS. 8 and 9 below provide some contextual illustration of how the mechanism of FIGS. 3 and 4 would relate to the rest of the rotor system. As shown in FIG. 3, tilt ball 362 surrounds and mates to sleeve 360. In operation, sleeve 360 prevents rotation of tilt ball 362 about top case 315. Sleeve 360 may also allow tilt ball 362 to translate axially on sleeve 360.

Non-rotating ring 340a is positioned around tilt ball 362. In the example of FIG. 3, pin 342 and key 344 prevent non-rotating ring 340a from rotating about the longitudinal axis of tilt ball 362 while allowing it to rotate around the spherical surface of tilt ball 362. In this example, key 344 fits within an external slot in tilt ball 362. Key 344 is configured to receive pin 342. Non-rotating ring 340a is also configured to receive pin 342, and pin 342 prevents tilt ball 362 and non-rotating ring 340a from rotating relative to one another.

Tilt ball 362 may include a spherical outer surface. This spherical outer surface allows swashplate 340 to rotate about the spherical shape of tilt ball 362. As stated above, rotation of non-rotating ring 340a causes rotating ring 340b to rotate, which in turn translates pitch links 350 up and down and feathers blades 330. Thus, teachings of certain embodiments recognize the capability to prevent radial rotation of non-rotating ring 340a while allowing rotation of non-rotating ring 340a about the spherical surface of tilt ball 362.

Bearing 346 separates tilt ball 362 and non-rotating ring 340a. In some embodiments, bearing 346 allows non-rotating ring 340a to rotate about the spherical shape of tilt ball 362. Bearing 346 is a replaceable wear item and may be made of any suitable bearing material, such as Teflon.

Rotating ring 340b is positioned around non-rotating ring 340a. Bearing 348 separates non-rotating ring 340a from rotating ring 340b and allows rotating ring 340b to rotate relative to non-rotating ring 340a. In operation, rotating ring 340b rotates with drive levers 352 and drive links 354.

Rotating ring 340b also translates axially with non-rotating ring 340a as non-rotating ring 340a rotates about the spherical surface of tilt ball 362.

FIG. 4 illustrates a transverse cross-section of an example control system. As shown in FIG. 4, top case 415 surrounds drive shaft 410. Sleeve 460 is attached to and around top case 415. Tilt ball 462 is attached to sleeve 460 such that sleeve 460 prevents rotation of tilt ball 462 about top case 415. Non-rotating ring 440a is positioned around tilt ball 462. Pin 442 and key 444 prevent non-rotating ring 440a from rotating around top case 415. Rotating ring 440b is positioned around non-rotating ring 440a, and is free to rotate around non-rotating ring 440a with the use of bearing 448.

As shown in FIG. 4, sleeve 460 includes splines that mate with splines on tilt ball 462. In the example of FIG. 4, the splines on sleeve 460 are continuous around the outer diameter of sleeve 460, and the splines on tilt ball 462 are continuous around the inner diameter of tilt ball 462. The splines on sleeve 460 and tilt ball 462 are shown in greater detail in FIG. 5.

In some embodiments, the splines of sleeve 460 and tilt ball 462 provide direct contact between sleeve 460 and tilt ball 462. Direct contact may allow the outer diameter of tilt ball 462 to be reduced. In turn, this may allow the diameters of non-rotating ring 442a and rotating ring 442b to be reduced. Accordingly, teachings of certain embodiments recognize that using splines may reduce the outer diameter of swashplate 440.

FIG. 5 illustrates an enlarged view of the control system of FIG. 4, showing the mesh of the splines on sleeve 460 and tilt ball 462.

In some embodiments, the spline surfaces of sleeve 460 and tilt ball 462 may be treated with an appropriate surface treatment or coating to reduce wear and friction between the parts. For example, sleeve 460 and/or tilt ball 462 may be anodized. Anodization is an electrolyte passivation process used to increase the thickness of the natural oxide layer on the surface of metal parts. In one example embodiment, sleeve 460 and/or tilt ball 462 may be treated using a process called Keronite, which may produce a hard, dense ceramic surface layer on sleeve 460 and/or tilt ball 462.

In the example of FIG. 5, the splines on sleeve 460 and tilt ball 462 have sharp peaks, but may have a variety of interlocking shapes.

FIG. 6 illustrates an alternative embodiment of an anti-drive mechanism. Illustrated in FIG. 6 is an anti-drive mechanism that may include a key-and-slot combination instead of the spline configuration of FIGS. 3-5.

As can be seen in FIG. 6, the key-and-slot configuration may be much simpler than the spline configuration disclosed above. In this illustration, a set of three keys 616 are attached to top case 624. In this illustration, keys 616 are located radially equidistantly around the circumference of top case 624. Keys 616 are attached to top case 624, thus, in some embodiments, eliminating the need for a full sleeve mechanism that may be necessary for the spline configuration above. Note, however, that this embodiment is not incompatible with a sleeve configuration. In some examples, a sleeve could be provided with the necessary keys.

In this illustration, tilt ball 604 sits around a top case 624 for the gearbox, which is illustrated in more detail in FIGS. 8 and 9. Tilt ball 604 includes slots that mate to key 616 in a key and slot system. Keys 616 run axially along the top case 624 and guide bearings 618 to ensure that tilt ball 604 does not bind, and to permit axial movement up and down top case 624. The spacing may be selected to be near enough to effectively provide an anti-drive mechanism for tilt ball 604 to ensure that tilt ball 604 does not rotate relative to top case 624. While three keys are illustrated here by way of example, more or fewer keys may be provided in other embodiments. The number of keys used may be selected according to criteria such as the desires strength of the anti-drive, and the desired weight characteristics.

In this illustration, tilt ball 604 sits around top case 624 for the gearbox illustrated in more detail in FIGS. 8 and 9. Tilt ball 604 includes three slots 612 that mate to keys 616 in a key-and-slot system. Keys 616 run axially along top case 624, and guide bearings 618 mate tilt ball 604 to keys 616. There is enough spacing provided between key 616 and guide bearing 618 to ensure that tilt ball 604 does not bind, and to permit axial movement up and down top case 624. However, the spacing is near enough to effectively provide an anti-drive mechanism for tilt ball 604 to ensure that tilt ball 604 does not rotate relative to top case 624. In an illustrative embodiment, the spacing between key 616 and slot 612 may be less than approximately 1 mm.

There is illustrated in this embodiment the use of bosses on key 616 and holes in top case 624. Holes in top case 624 may provide a non-loadbearing floating insert 624a along with fasteners 625 that are a second retaining feature for key 616 and top case 624.

Also illustrated in this embodiment is the use of a stop surface on key 616a to provide a lower bound to the axial movement of tilt ball 604 along top case 624. Stop surface on key 616a ensures that tilt ball 604 does not slide down to or past top case 624.

Although not seen in this FIGURE, the drive shaft may be disposed within top case 624, and may pass through the center of top case 624.

FIG. 7 illustrates a cutaway view of select elements of the anti-drive mechanism of FIG. 6. Visible in this FIGURE are tilt ball 604, guide bearings 618, and key 616. FIG. 7 illustrates the alignment of the various elements, how key 616 is attached to top case 624, and how guide bearing 618 in tilt ball 604 functions on key 616. As described above, this permits tilt ball 604 to move axially along key 616 attached to top case 624, while preventing rotation of tilt ball 604 relative to top case 624.

FIG. 8 illustrates an example helicopter rotor assembly 800. Helicopter rotor assembly 800 represents a simplified version of the helicopter rotor assembly of FIG. 9. In FIG. 8, helicopter rotor assembly 800 includes a power train 805, a drive shaft 810, a rotor hub assembly 820, blades 830, a swashplate 840, and pitch links 850. In some examples, helicopter rotor assembly 800 may include more or fewer components. For example, FIG. 8 does not show components such as a gearbox, a yoke, drive links, drive levers, and other components, such as those illustrated in the rotor assembly of FIG. 9 that may be incorporated.

Power train 805, drive shaft 810, and rotor hub assembly 820 are mechanical components for transmitting torque and/or rotation. Power train 805 may include a variety of component, including an engine, a transmission, and differentials. In operation, drive shaft 810 receives torque or rotational energy from power train 805 and rotates rotor hub assembly 820. Rotation of rotor hub assembly 820 causes blades 830 to rotate about drive shaft 810.

Swashplate 840 translates helicopter flight control input into motion of blades 830. Because blades 830 are typically spinning when the helicopter is in flight, swashplate 840 may transmit flight control input from the non-rotating fuselage to the rotating drive assembly 820 and/or blades 830.

In some examples, swashplate 840 may include a non-rotating swashplate ring 840a and a rotating swashplate ring 840b. Non-rotating swashplate ring 840a does not rotate with drive shaft 810, whereas rotating swashplate ring 840b does rotate with drive shaft 810. In the example of FIG. 8, pitch links 850 connect rotating swashplate ring 840b to blades 830.

In operation, according to one example embodiment, translating the non-rotating swashplate ring 840a along the axis of drive shaft 810 causes the pitch links 830 to move up or down. This changes the pitch angle of all blades equally, increasing or decreasing the thrust of the rotor and causing the aircraft to ascend or descend. Tilting the non-rotating swashplate ring 840a causes the rotating swashplate 840b to tilt, moving the pitch links up and down cyclically as they rotate with the drive shaft. This tilts the thrust vector of the rotor, causing the aircraft to translate horizontally following the direction the swashplate is tilted.

In the example of FIG. 8, non-rotating swashplate ring 840a should not rotate with drive shaft 810, whereas rotating swashplate ring 840b should rotate with drive shaft 810. Teachings of certain embodiments provide the capability to prevent a non-rotating swashplate ring from rotating while allowing the rotating swashplate ring to rotate with the rotor blades. A particular embodiment is described below with regard to FIG. 9.

FIG. 9 illustrates a rotor system 900, according to one example embodiment. Rotor system 900 features a drive shaft 910, a gearbox 915, a yoke 920, grips 925, blades 930, a swashplate 940 having a non-rotating swashplate ring 940a and a rotating swashplate ring 940b, pitch links 950, drive levers 952, drive links 954, and a sleeve 960.

Drive shaft 910, yoke 920, grips 925, drive levers 952, and drive links 954 are mechanical components for transmitting torque and/or rotation. In rotor system 900, grips 925 couple blades 930 to yoke 920, which is coupled to drive shaft 910. Drive levers 952 and drive links 954 couple yoke 920 to rotating swashplate ring 940b. In operation, drive shaft 910 receives torque or rotational energy and rotates yoke 920. Rotation of yoke 920 causes grips 925 to rotate blades 930 and causes drive levers 952 and drive links 954 to rotate rotating swashplate ring 940b.

Swashplate 940 translates flight control input into motion of blades 930. Because blades 930 are typically spinning when the helicopter is in flight, swashplate 940 may transmit flight control input from the non-rotating fuselage to the rotating yoke 920, grips 925, and/or blades 930.

Swashplate 940 includes a non-rotating swashplate ring 940a and a rotating swashplate ring 940b. Non-rotating swashplate ring 940a does not rotate with drive shaft 910, whereas rotating swashplate ring 940b does rotate with drive shaft 910. Rotating swashplate ring 940b may be coupled to blades 930 via pitch links 950, which allow rotating swashplate ring 940b to control deflection of blades 930. In operation, translating or tilting non-rotating swashplate ring 940a causes rotating swashplate ring 940b to translate or tilt, which in turn moves pitch links 950 up and down.

Sleeve 960 is coupled to and around gearbox 915. In the illustrated embodiment, sleeve 960 is substantially cylindrical. Gearbox 915 surrounds drive shaft 910 and separates rotating drive shaft 910 from non-rotating components such as sleeve 960 and non-rotating swashplate ring 940a.

Sleeve 960 prevents non-rotating swashplate ring 940a from rotating with drive shaft 910. In some embodiments, using sleeve 960 to prevent rotating of non-rotating swashplate ring 940a may allow for a shorter rotor system 900. For example, in some embodiments, sleeve 960 may eliminate the need to externally couple non-rotating swashplate ring 940a directly to gearbox 915. If non-rotating swashplate ring 940a is not coupled directly to gearbox 215, then the overall size and height of rotor system 900 may be reduced.

The flowcharts and diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein.

Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Embodiments of the teachings of the present specification may include the following nonlimiting examples, substantially as described.

There is disclosed in one example a swashplate assembly for a rotary aircraft, comprising: a rotating ring configured to rotate with a drive shaft of the rotary aircraft; a non-rotating ring coupled to the rotating ring and rotationally decoupled from the rotating ring, wherein the non-rotating ring does not rotate with the rotating ring and drive shaft; an outer casing disposed around the gearbox; and an anti-drive mechanism to maintain the outer casing rotationally stationary relative to the gearbox, the anti-drive mechanism comprising a key and slot system between the gearbox and the outer casing.

There is further disclosed an example swashplate assembly, wherein the nonrotating ring is coupled to the rotating ring via a duplex or triplex bearing.

There is further disclosed an example swashplate assembly, wherein the outer casing comprises a tilt ball.

There is further disclosed an example swashplate assembly, further comprising a plurality of key-and-slot pairs.

There is further disclosed an example swashplate assembly, wherein the key-and-slot pairs are disposed substantially equidistantly around a circumference of the top case.

There is further disclosed an example swashplate assembly, wherein the key of the key-and-slot system is located on a circumference of a top case.

There is further disclosed an example swashplate assembly, wherein the key is attached to the top case.

There is further disclosed an example swashplate assembly, further comprising a tilt ball around the top case, wherein the tilt ball contains the slots to mate with keys of the key-and-slot system.

There is further disclosed an example swashplate assembly, wherein the key is steel.

There is further disclosed an example swashplate assembly, wherein the key further comprises a chrome wear surface.

There is further disclosed an example swashplate assembly, wherein slots of the key-and-slot system comprise replaceable wear items comprising a polytetrafluoroethylene liner.

There is further disclosed an example swashplate assembly, further comprising pins and keys to align the outer casing with the nonrotating ring.

There is further disclosed an example swashplate assembly, further comprising guide bearings to align the outer casing with the top case.

There is also disclosed an example nonrotating ring for a swashplate of a rotary aircraft control system, comprising: a through hole to receive a drive shaft of the rotary aircraft; and a plurality of keys affixed to and disposed substantially equidistantly around an inner diameter of the nonrotating ring, the keys to engage a tilt ball, and to permit radial movement around a spherical shape of the tilt ball while preventing rotation of the nonrotating ring relative to the tilt ball.

There is further disclosed an example nonrotating ring, further comprising a coupling to couple to a rotating ring via a duplex or triplex bearing.

There is further disclosed an example nonrotating ring, wherein the keys are disposed substantially equidistantly around a circumference of the top case.

There is further disclosed an example nonrotating ring, wherein the keys are attached to the top case.

There is further disclosed an example nonrotating ring, further comprising a tilt ball around the top case, wherein the tilt ball contains slots to mate with keys of a key-and-slot system.

There is further disclosed an example nonrotating ring, wherein the plurality of keys are steel.

There is further disclosed an example nonrotating ring, wherein the plurality of keys comprise a chrome wear surface.

There is further disclosed an example nonrotating ring, wherein slots of the key-and-slot system comprise replaceable wear items comprising a polytetrafluoroethylene liner.

There is further disclosed an example nonrotating ring, further comprising pin holes to align an outer casing with the nonrotating ring.

There is also disclosed an example tilt ball for controlling a rotary aircraft, comprising: a spherical casing having a central through hole to receive a top case; and slots disposed around an inner diameter of the through hole to engage keys on the top case.

There is further disclosed an example tilt ball, wherein the slots are disposed substantially equidistantly around a circumference of the inner diameter of the through hole.

There is further disclosed an example tilt ball, further comprising splines disposed axially along the inner diameter of the through hole.

There is further disclosed an example tilt ball, further comprising pins to align the spherical casing with the top case.

There is further disclosed an example tilt ball, further comprising guide bearings to align the spherical casing with the top case.

There is also disclosed an example rotary aircraft, comprising: an airframe; a main rotor assembly; a gearbox and drive shaft to drive the main rotor assembly; a pilot control input; a swashplate assembly to translate pilot control inputs to motion of the main rotor assembly, the swashplate assembly comprising: a rotating ring to engage the drive shaft and to rotate with the drive shaft; a nonrotating ring mechanically coupled to the rotating ring and rotationally decoupled from the rotating ring, wherein the nonrotating ring does not rotate with the rotating ring and the drive shaft; a tilt ball mechanically coupled to the nonrotating ring; and anti-drive means to permit the tilt ball to slide axially along the top case and to prevent the tilt ball and top case from rotating relative to one another, the anti-drive means comprising a key-and-slot system.

There is further disclosed an example rotary aircraft, wherein the nonrotating ring is coupled to the rotating ring via a duplex or triplex bearing.

There is further disclosed an example rotary aircraft, further comprising a plurality of key-and-slot pairs.

There is further disclosed an example rotary aircraft, wherein the key-and-slot pairs are disposed substantially equidistantly around a circumference of the top case.

There is further disclosed an example rotary aircraft, further comprising three key-and-slot pairs.

There is further disclosed an example rotary aircraft, wherein the key of the key-and-slot system is located on a circumference of a top case.

There is further disclosed an example rotary aircraft, wherein keys of the key-and-slot system are attached to the nonrotating ring.

There is further disclosed an example rotary aircraft, further comprising a sleeve around the nonrotating ring, wherein the tilt ball contains the slots to mate with keys of the key-and-slot system.

There is further disclosed an example rotary aircraft, wherein the key-and-slot system includes steel keys.

There is further disclosed an example rotary aircraft, wherein the keys comprise a chrome wear surface.

There is further disclosed an example rotary aircraft, wherein slots of the key-and-slot system comprise replaceable wear items comprising a polytetrafluoroethylene liner.

There is further disclosed an example rotary aircraft, further comprising pins and keys to align the tilt ball with the nonrotating ring.

There is further disclosed an example rotary aircraft, further comprising guide bearings to align the tilt ball with the top case.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure, but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z," "at least one of X, Y or Z," "one or more of X, Y and Z," "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A swashplate assembly for a rotary aircraft, comprising:
   a rotating ring configured to rotate with a drive shaft of the rotary aircraft;

a non-rotating ring coupled to the rotating ring and rotationally decoupled from the rotating ring, wherein the non-rotating ring does not rotate with the rotating ring and drive shaft;

an outer casing to fit around a gearbox, wherein a contact surface between the outer casing and the gearbox is unsplined; and an anti-drive mechanism to maintain the outer casing rotationally stationary relative to the gearbox, the anti-drive mechanism comprising an unpinned key-and-slot system between the gearbox and the outer casing on the unsplined contact surface, the key-and-slot system comprising a plurality of keys disposed equidistantly around a circumference of the gearbox, the keys having a long axis along a height of the gearbox with a length longer than a height of the outer casing, and a short axis along a circumference of the gearbox having a width substantially shorter than the long axis, and a plurality of slots disposed on the outer casing having position and size to securely enclose the plurality of keys.

2. The swashplate assembly of claim 1, wherein the non-rotating ring is coupled to the rotating ring via a duplex or triplex bearing.

3. The swashplate assembly of claim 1, wherein the outer casing comprises a tilt ball.

4. The swashplate assembly of claim 1, wherein slots of the key-and-slot system comprise replaceable wear items comprising a polytetrafluoroethylene liner.

5. The swashplate assembly of claim 1, further comprising pins and keys to align the outer casing with the non-rotating ring.

6. The swashplate assembly of claim 1, wherein the key-and-slot system comprises a plurality of key-and-slot pairs.

7. The swashplate assembly of claim 6, wherein the key-and-slot pairs are disposed substantially equidistantly around a circumference of the unsplined contact surface.

8. The swashplate assembly of claim 1, wherein the key of the key-and-slot system is located on a circumference of a gear box.

9. The swashplate assembly of claim 8, further comprising a tilt ball around the gear box, wherein the tilt ball contains the slots to mate with keys of the key-and-slot system.

10. The swashplate assembly of claim 8, wherein the key is steel.

11. The swashplate assembly of claim 8, wherein the key is attached to the gear box.

12. The swashplate assembly of claim 11, wherein the key is aluminum.

13. The swashplate assembly of claim 11, wherein the key further comprises a chrome wear surface.

14. The swashplate assembly of claim 13, further comprising a tungsten carbide coating on the aluminum key.

15. A non-rotating ring for a swashplate of a rotary aircraft control system, comprising:

a through hole to receive a drive shaft of a rotary aircraft; and a plurality of keys affixed to and disposed substantially equidistantly around an unsplined inner diameter of the non-rotating ring, the keys to engage an outer casing of a tilt ball, and to permit radial movement around a spherical shape of the tilt ball while preventing rotation of the non-rotating ring relative to the tilt ball, wherein an interface between the tilt ball and the non-rotating ring is unpinned, and wherein the plurality of keys have a long axis along a height of the non-rotating ring with a length longer than a height of the outer casing, and a short axis along a circumference of the non-rotating ring having a width substantially shorter than the long axis.

16. The non-rotating ring of claim 15, wherein the keys are attached to the non-rotating ring.

17. The non-rotating ring of claim 15, wherein the plurality of keys are aluminum bronze.

18. The non-rotating ring of claim 15, wherein a plurality of slots in the tilt ball comprise a tungsten carbide wear surface.

19. A rotary aircraft, comprising:

an airframe;

a main rotor assembly;

a gearbox and drive shaft to drive the main rotor assembly;

a pilot control input;

a swashplate assembly to translate pilot control inputs to motion of the main rotor assembly, the swashplate assembly comprising:

a rotating ring to engage the main rotor assembly and to rotate with the drive shaft;

a non-rotating ring mechanically coupled to the rotating ring and rotationally decoupled from the rotating ring, wherein the non-rotating ring does not rotate with the rotating ring and the drive shaft;

a tilt ball mechanically coupled to the non-rotating ring to prevent the tilt ball and non-rotating ring from rotating relative to one another; and an unpinned key-and-slot system on an unsplined mechanical interface between a contact surface of the tilt ball and the gearbox, comprising a plurality of keys disposed equidistantly around a circumference of the gearbox, the plurality of keys having a long axis along a height of the gearbox with a length longer than a height of the tilt ball, and a short axis along a circumference of the gearbox having a width substantially shorter than the long axis, and a plurality of slots disposed on the tilt ball having position and size to securely enclose the plurality of keys.

20. The rotary aircraft of claim 19, wherein the non-rotating ring is coupled to the rotating ring via a duplex or triplex bearing.

* * * * *